Patented July 10, 1951

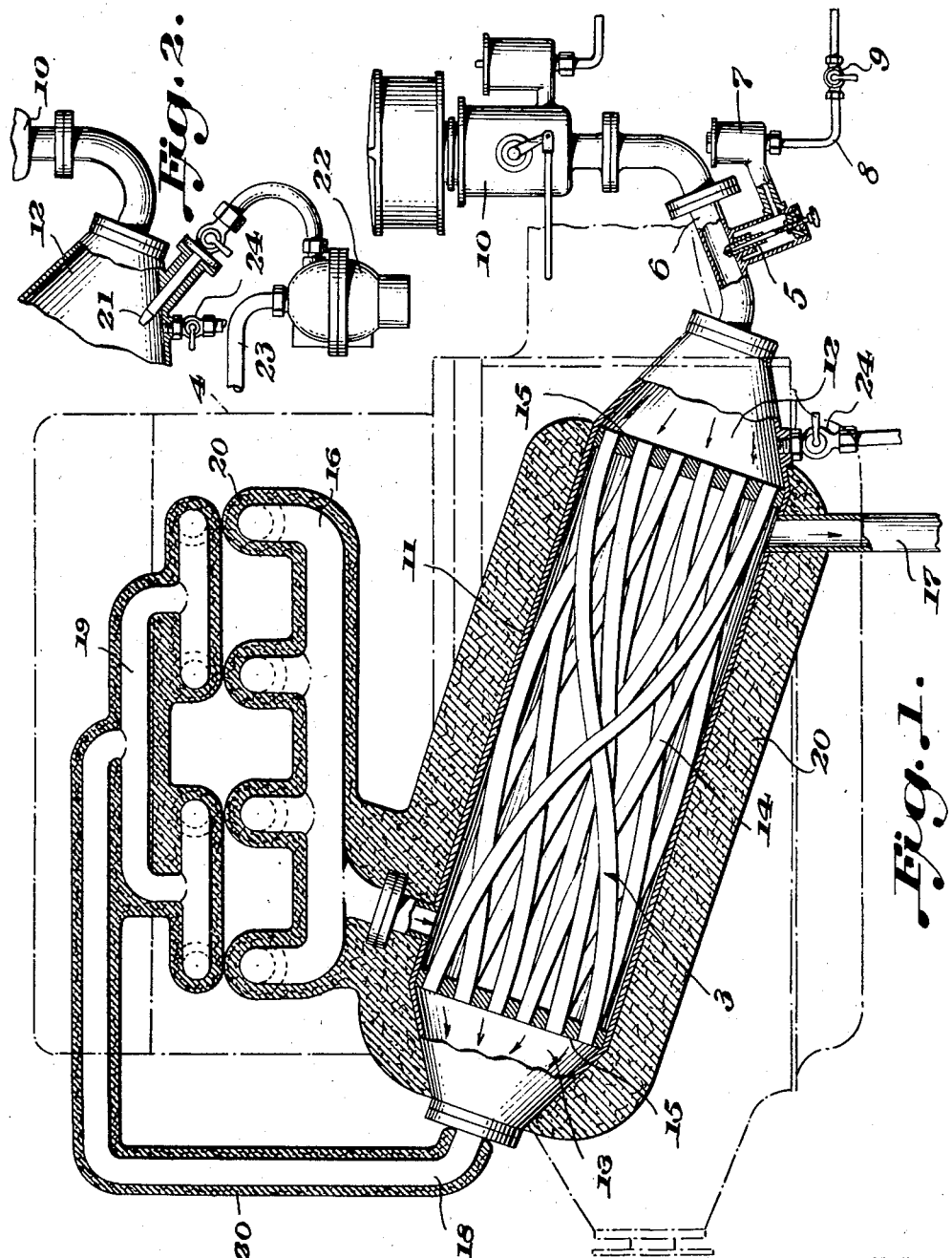

2,560,197

UNITED STATES PATENT OFFICE 2,560,197

METHOD OF OPERATING INTERNAL-COMBUSTION ENGINES AND MEANS FOR THE PERFORMANCE OF THAT METHOD

Paul Xavier Spillane, Ashfield, Sydney, Australia, assignor to Keith Williams, Sydney, New South Wales, Australia Application April 4, 1949, Serial No. 85,302
In Australia May 17, 1948

6 Claims. (Cl. 123—25)

This invention relates to internal combustion engines and has been devised with the object of raising the overall efficiency of known forms of internal combustion engines.

The object of the invention is attained by embodying in the heat cycle an inert in the form of water vapour and utilising particularly the latent heat of the water vapour exhausted from the engine in such manner that the heat losses are considerably reduced.

According to this invention a method of operating an internal combustion engine comprises mixing water vapour with the working substance being induced, at least part of the heat required for the vaporisation of the water vapour being supplied by latent heat of condensation of water vapour in the exhaust gases.

Further the invention comprises in combination an internal combustion engine and means for mixing water vapour with the working substance being induced, said means being such that at least part of the heat required for the vaporisation of the water vapour is supplied by latent heat of condensation of water vapour in the exhaust gases.

In this specification the term induced working substance is intended to mean the substance which normally passes into the cylinder through the inlet manifold and would comprise air in the case of compression ignition engines and air/fuel mixture in the case of spark ignition engines. The term equally applies where supercharging is employed.

The use of water vapour in internal combustion engines to reduce the upper limits of temperature and heat losses as a result of detonation, radiation and other causes is known. It is also well known that the presence of dry water vapour in the charge of an internal combustion engine does not hamper in any way the combustion of the charge but on the other hand tends to produce a more efficient combustion due to the better mixing of the reacting vapours.

Hitherto, the water vapour necessary for the impregnation of the ingoing charge has been generated by boiling water in some suitable container by means of the sensible heat of the exhaust gases or by the utilisation of the heat picked up in the jacket cooling water. In such known applications of water vapour in internal combustion engines there has been a total loss of the latent heat of vaporisation of the water, which constitutes about 80–90% of the available heat in the water vapour, so that the economy obtained is so small that it is not possible in many cases to notice any appreciable difference in the working efficiency of the engine.

In the present invention the necessary water vapour is generated with a greatly reduced loss of latent heat, the heat required for generation of the water vapour being provided by the latent heat of the exhaust steam and the sensible heat of the exhaust gases.

All the necessary water vapour for admixture with the induced working substance is generated below boiling point, the properties of air to absorb water vapour below the boiling point being fully exploited.

The invention will be now further described in its application to a spark ignition gasoline engine, reference being made to the accompanying drawings in which the combination of apparatus is shown diagrammatically.

Fig. 1 is a part sectional elevation of apparatus arranged according to this invention, and Fig. 2 is a part sectional elevation of part of the apparatus shown in Fig. 1 embodying alternative means for supplying water.

In the particular embodiment shown in the drawings a heat exchanger 3 is mounted in inclined disposition adjacent to an internal combustion engine indicated by the chain outline 4. A water atomising jet 5 is secured in an inlet adaptor 6 having a float chamber 7 with a water inlet pipe 8 and cock 9 secured thereto. The inlet adaptor 6 at one end is secured to and communicates with one end of the heat exchanger. The outer end of the inlet adaptor 6 has a carburetor 10 of conventional type attached thereto.

The heat exchanger comprises a cylindrical casing 11 with convergent ends, which form inlet and outlet chambers 12 and 13 respectively for the air/fuel-water vapour mixture, a multiplicity of curved fine bore tubes 14 spaced apart from each other and fluid tightly supported in end plates 15 which are in turn fluid tightly secured to the cylindrical casing at opposite ends thereof. The tubes 14 provide fluid communication between the chambers 12 and 13. Preferably but not essentially the heat exchanger is of counterflow type. To meet this requirement the exhaust manifold 16 of the engine is connected to the cylindrical casing 11 of the heat exchanger adjacent to the outlet chamber 13 and an exhaust outlet pipe 17 extends from casing 11 adjacent to the inlet chamber 12. An outlet pipe 18 is secured at one end to the heat exchanger in communication with the chamber 13 and is secured at its other end to the inlet manifold 19 of the engine.

To reduce radiation heat losses all parts of the apparatus whose temperature, in use, is raised above the atmospheric temperature are lagged with heat insulating material 20 in known manner. The principal parts so insulated are, the heat exchanger, the inlet and exhaust manifolds and extensions thereof, and the cylinders and cylinder heads of the engine.

In use a mixture of atomised fuel and air passes from the carburetor over the water-atomising jet 5 where it is admixed with water in a finely divided state. The wet mixture then passes through the tubes 14 of the heat exchanger where it is heated gradually over a range of from the existing atmospheric temperature to approximately 170–180 degrees F., the orifice of the water atomising jet being preferably of such size that the air/fuel mixture is fully saturated or very nearly saturated at this temperature.

The atomised water in passing through the heat exchanger takes up latent heat and the air/fuel-water vapour mixture then passes through the inlet manifold to the cylinders of the engine. The purpose of this saturation with water vapour at a gradually increasing temperature is to expand the volume of the ingoing mixture to a large degree without in any way interfering with the ratio of air to gasoline which must remain the same to ensure efficient combustion within the cylinders. Fully saturated air at 170 degrees F., has approximately 3 to 4 times the volume of dry air at the same temperature. Each cylinder therefore takes in only about one-third of the combustible mixture it would normally take up without saturation. However, as the other two-thirds of the ingoing charge is made up of water vapour the weight of the ingoing charge is substantially unaltered and, as the volumetric efficiency is unimpaired and the compression ratio remains the same, the compression pressure is also substantially unaltered. Furthermore the mixture of gasoline vapour and air is more homogeneous and combustion is more controlled and efficient owing to the increased volume and more uniform flame propagation.

Some of the heat of combustion of the air/fuel mixture is absorbed in superheating the water vapour and consequently the upper limit of temperature of combustion, as compared to existing engines operating at the same compression ratio, is reduced to such a value that cooling means such as a water jacket and radiator may be materially reduced or dispensed with. In existing engines approximately 35% of the available heat is lost in this manner.

The major part of the heat absorbed in superheating the water vapour is regained, however, in useful work done owing to the expansion properties of the steam. The exhaust gases are directed into the heat exchanger where latent heat from the water vapour and sensible heat from the exhaust gases and the condensate are taken up by the ingoing mixture as earlier described whereby the temperature of the final exhaust products approaches closely to the ambient temperature.

The amount of water vapour exhausted through the heat exchanger is greater than the amount taken in to the engine owing to additional water being formed during combustion of the fuel/air mixture, and thus ample latent heat is liberated by the condensation of the water vapour in the exhaust gases to vaporise the atomised water passing through the heat exchanger with the air/fuel mixture.

In existing engines approximately 35% of the available heat is lost in water jacket and radiator cooling and in addition approximately 40% of the available heat is lost with the exhaust gases which are discharged from the engine at a comparatively high temperature. In an engine operating according to the present invention a large proportion of this loss is avoided.

Although only portion of the normal combustible charge is taken in to the cylinders the ratio of air to gasoline is maintained correct for combustion. In starting from cold the supply of water is shut off for example by an adjustable needle valve in the jet 5 or like means until the engine and heat exchanger reach their normal operating temperature. Although shown diagrammatically the water atomising means may embody any known means as employed in carburetors for atomising a liquid, whereby the quantity of water admitted may be varied as desired with the air fuel mixture.

As with carburetors the water atomising means must be adjusted in a similar manner to obtain a satisfactory mixture over the operating range.

In Fig. 2 is shown further means for supplying water in an atomised state. The means comprises a spray nozzle 21 secured in the wall of the heat exchanger so as to extend into the inlet chamber 12, and a pump 22 of any suitable known type which is connected to the nozzle and driven from the engine. Water from a bulk source is supplied to the pump through an inlet pipe 23. The pump is preferably provided with a by-pass check valve to prevent pressure in the pump exceeding a predetermined value. Pumps with this feature are known.

A drain cock 24 is provided in the induction line between the water supply and the inlet manifold of the engine.

The heat exchanger according to this invention is not limited to any particular type, the aim being to obtain a heat transfer efficiency as high as possible. However the heat exchanger must be arranged or constructed in such a way that the condensate escapes with the exhaust gases.

In order to save further heat a water trap may be provided in the exhaust outlet pipe to receive the condensate and direct it through an economiser embodying the water pump inlet pipe whereby sensible heat in the condensate is employed to raise the temperature of the ingoing water.

In the application of the apparatus to compression ignition engines the carburetor is removed and air only is induced over the water atomising means.

Having now fully described and ascertained my said invention and the manner in which it is to be performed, I declare that what I claim is:

1. A method of operating an internal combustion engine having a carburetor and a heat exchanger comprising admixing water in a finely divided state with the working substance to be induced in said engine between the carburetor and the heat exchanger, vaporizing the water in the mixture at temperatures below its boiling point to form water vapor, at least part of the heat required for the vaporization of the water vapor being supplied by latent heat of condensation of water vapor in the exhaust gases, and introducing the so-formed mixture of water vapor and working substance to the engine whereby the gasoline volume introduced into the engine is substantially reduced while the fuel ratio remains substantially constant thereby lowering the temperature range and maintaining substantially the same power output.

2. A method as claimed in claim 1, wherein the water and working substances are raised gradually over a range from the existing atmospheric temperature to approximately 170° to 180° F.

3. A method as claimed in claim 2, wherein the water introduced into the working substance is sufficient to substantially saturate the working substance mixture at the given temperature.

4. A method of operating an internal combustion engine having a carburetor and a vaporizer comprising admixing water in a finely divided state with the working substance to be induced in said engine between the carburetor and the vaporizer, said water and said working substance being at atmospheric temperature, subjecting the mixture of working substance and water to the exhaust gases of the engine in the vaporizer and heating the mixture gradually over a range of from the existing atmospheric temperature to approximately 170° to 180° F., the water being introduced in sufficient quantity to substantially saturate the mixture at that temperature, at least part of the heat required for vaporization of the water being supplied by latent heat of condensation of water vapor in the exhaust gases, and introducing the mixture of water vapor and working substance to the engine whereby the gasoline volume introduced into the engine is substantially reduced while the fuel ratio remains substantially constant thereby lowering the temperature range and maintaining substantially the same power output.

5. In combination, an internal combustion engine, a carburetor, a heat exchanger, communicating means from said carburetor to said heat exchanger for the induced working substance, water supply means in said communicating means between said carburetor and said heat exchanger for supplying water in an atomized state to said working substance, an outlet from said heat exchanger connected to the inlet manifold of the engine, an exhaust gas inlet to said heat exchanger in proximity to the outlet end of said heat exchanger and connected to the exhaust manifold of the engine, and a final exhaust outlet leading from the heat exchanger in proximity to the inlet end thereof, said heat exchanger being adapted to gradually raise the temperature of the induced working substance passing therethrough and vaporizing the water particles admixed therewith by means of at least part of the latent heat in the steam exhausted from the engine.

6. In combination, an internal combustion engine, a heat exchanger, an inlet to said heat exchanger for the induced working substance, means in said inlet between its orifice and the heat exchanger for supplying water in an atomized state to said working substance, a plurality of tubes opening into said inlet and extending through said heat exchanger in tortuous path for transmission of said water and working substance through said heat exchanger, an outlet from said heat exchanger in communication with the outlet ends of said tubes, said heat exchanger outlet being connected to the inlet manifold of the engine, an exhaust gas inlet to said heat exchanger in proximity to the outlet ends of said tubes and connected to the exhaust manifold of the engine, and a final exhaust outlet leading from the heat exchanger in proximity to the inlet ends of said tubes, said heat exchanger being adapted to gradually raise the temperature of the induced working substance passing therethrough and vaporizing the water particles admixed therewith by means of at least part of the latent heat in the steam exhausted from the engine.

PAUL XAVIER SPILLANE.

REFERENCES CITED

The following references are of record in the file of this patent:

UNITED STATES PATENTS

| Number | Name | Date |
|---|---|---|
| 1,328,844 | Oberreich | Jan. 27, 1920 |
| 1,338,511 | Lacerda | Apr. 27, 1920 |
| 1,344,793 | Dasey | June 29, 1920 |
| 1,547,985 | Wein | July 28, 1925 |
| 1,623,452 | Wight | Apr. 5, 1927 |
| 1,633,251 | Heinz | June 21, 1927 |